(12) United States Patent
Lee et al.

(10) Patent No.: US 8,767,839 B2
(45) Date of Patent: Jul. 1, 2014

(54) ERROR FILTER TO DIFFERENTIATE BETWEEN REVERSE LINK AND FORWARD LINK VIDEO DATA ERRORS

(75) Inventors: Yen-Chi Lee, San Diego, CA (US); Nikolai Konrad Nepomuceno Leung, Takoma Park, MD (US)

(73) Assignee: Qualcomm Incorporated, San Diego, CA (US)

( * ) Notice: Subject to any disclaimer, the term of this patent is extended or adjusted under 35 U.S.C. 154(b) by 1942 days.

(21) Appl. No.: 11/625,787

(22) Filed: Jan. 22, 2007

(65) Prior Publication Data

US 2008/0176517 A1    Jul. 24, 2008

(51) Int. Cl.
*H04B 14/00* (2006.01)
*H04N 21/61* (2011.01)
*H04N 21/647* (2011.01)

(52) U.S. Cl.
CPC ....... *H04N 21/6131* (2013.01); *H04N 21/6181* (2013.01); *H04N 21/64776* (2013.01)
USPC ................ 375/240.27; 348/14.02; 348/425.2; 348/466

(58) Field of Classification Search
CPC .......... H04N 21/6131; H04N 21/6181; H04N 21/64776
USPC ......................................................... 375/240
See application file for complete search history.

(56) References Cited

U.S. PATENT DOCUMENTS

| 5,864,547 | A | * | 1/1999 | Strodtbeck et al. | 370/318 |
| 5,940,769 | A | * | 8/1999 | Nakajima et al. | 455/509 |
| 6,389,034 | B1 | * | 5/2002 | Guo et al. | 370/441 |
| 6,397,043 | B1 | * | 5/2002 | Kang | 455/69 |
| 7,072,403 | B2 | * | 7/2006 | Kimoto | 375/240.27 |
| 2001/0025239 | A1 | * | 9/2001 | Hakenberg et al. | 704/200.1 |
| 2002/0026614 | A1 | * | 2/2002 | Park et al. | 714/752 |

(Continued)

FOREIGN PATENT DOCUMENTS

| JP | 2004147183 A | 5/2004 |
| JP | 2004350300 A | 12/2004 |
| RU | 2019044 | 8/1994 |
| SU | 1633521 | 3/1991 |

OTHER PUBLICATIONS

Qu et al., An Adaptive Motion-Based Unequal Error Protection Approach for Real-Time Video Transport Over Wireless IP Networks, Oct. 2006, IEEE Transactions on Multimedia, vol. 8, No. 5, pp. 1033-1044.*

(Continued)

*Primary Examiner* — Taghi Arani
*Assistant Examiner* — Kenneth Chang
(74) *Attorney, Agent, or Firm* — Brent A. Boyd (57) ABSTRACT

One technique for implementing error control in response to a video data error comprises receiving an indication of a video data error from a video decoder, determining whether the video data error occurred on a reverse link of a wireless network between a video encoder and a network device, and applying error control in response to the video data error if the video data error did not occur on the reverse link. For example, the indication of the video data error may include a first sequence number (SN) of a packet comprising lost data, and determining whether the video data error occurred on the reverse link may include comparing first SN with a second SN of a packet associated with a most recent RL error.

31 Claims, 4 Drawing Sheets

(56) References Cited

U.S. PATENT DOCUMENTS

| | | | |
|---|---|---|---|
| 2002/0080802 A1 | 6/2002 | Sachs et al. | |
| 2003/0048852 A1* | 3/2003 | Hwang et al. | 375/240.26 |
| 2004/0009786 A1* | 1/2004 | Terry | 455/522 |
| 2004/0252761 A1 | 12/2004 | Brown et al. | |
| 2005/0254456 A1* | 11/2005 | Sakai et al. | 370/328 |
| 2006/0127100 A1* | 6/2006 | Frankel et al. | 398/158 |
| 2006/0165170 A1* | 7/2006 | Kim et al. | 375/240.12 |
| 2006/0188025 A1 | 8/2006 | Hannuksela | |
| 2007/0049318 A1* | 3/2007 | Qi et al. | 455/522 |
| 2007/0173275 A1* | 7/2007 | Das et al. | 455/522 |

OTHER PUBLICATIONS

International Search Report—PCT/US08/051720—International Search Authority, European Patent Office—Aug. 7, 2008.

Written Opinon—PCT/US08/051720—International Search Authority, European Patent Office—Aug. 7, 2008.

Cheung G., et al, "Double Feedback streaming agent for real-time delivery for media over 3G wireless networks," Wireless Communications and Networking, 2003. vol. 3, Mar. 16, 2003, pp. 2102-2106.

Yao Wang, et al., "Error Control and Concealment for Video Communication: A Review." Proceedings of the IEEE. vol. 86. No. 5, May 1, 1998, pp. 974-997.

Markopoulou A., et al., "Wise video: using in-band wireless loss notification to improve rate-controlled video streaming," Multimedia and Expo, 2004. Taipei, Taiwan, Jun. 27-30, 2004, vol. 1, Jun. 27, 2004, pp. 249-252.

Hari Balakrishnan, et al., "Explicit Loss Notification and Wireless Web Performance," Proceedings IEEE Globcom Internet Mini-conference. Sydney, Australia. Nov. 1998, pp. 1-11.

Cen S., et al., "End-to-End Differentiation of Congestion and Wireless Losses," IEEE/ACM Transactions on Networking, vol. 11, No. 5. Oct. 1, 2003, pp. 703-717.

Ott, J., et al., "Extended RTP Profile for Real-time Transport Control Protocol (RTCP)-Based Feedback (RTP/AVPF); rfc4585.txt," IETF Standard, Internet Engineering Task Force. Jul. 1, 2006, pp. 1-53.

Etoh, M. et al., "Wireless Video Application in 3G and Beyond" IEEE Wireless Communications, IEEE Service Center, Piscataway, NJ, US, vol. 12, No. 4, Aug. 1, 2005, pp. 66-72, XP0111138001.

Taiwan Search Report—TW097102375—TIPO—Sep. 25, 2011.

\* cited by examiner

ERROR FILTER TO DIFFERENTIATE BETWEEN REVERSE LINK AND FORWARD LINK VIDEO DATA ERRORS

TECHNICAL FIELD

The disclosure relates to video encoding and, more particularly, techniques for efficient video error control.

BACKGROUND

Video telephony (VT) involves the real-time communication of packets carrying audio and video data. Each VT device includes a video encoder that obtains video from a video capture device, such as a video camera or video archive, and generates packets of video data ("video packets"). Similarly, an audio encoder in each VT device obtains audio from an audio capture device, such as a microphone or speech synthesizer, and generates packets of audio data ("audio packets"). The video packets and audio packets are placed in a radio link protocol (RLP) queue. A medium access control (MAC) layer module generates medium access control (MAC) layer packets from the contents of the RLP queue. The MAC layer packets are converted to physical (PHY) layer packets for transmission across a communication channel to another VT device.

In mobile VT applications, a VT device receives the physical layer packets via a wireless forward link (FL) (or "downlink") from a base station to the VT device, which may be a mobile wireless terminal such as a cellular radiotelephone. A VT device transmits the PHY layer packets via a wireless reverse link (RL) (or "uplink") from the VT device to the base station. Each VT device includes PHY and MAC layers to convert the received PHY and MAC layer packets and reassemble the packet payloads into audio packets and video packets. A video decoder within the VT device decodes the video data for presentation to a user via a display device. An audio decoder within the VT device decodes the audio data for presentation via an audio speaker. Likewise, a VT device may include a video encoder and audio encoder to encode video and audio, respectively, for transmission to another VT device.

Video data errors may occur during transmission of video packets from the video encoder to the video decoder. For example, the error may occur during transmission on the RL (from the video encoder to the base station), at the base station, or during transmission on the FL (from the base station to the video decoder). Errors can undermine the visual quality of the video presented to a user. However, a variety of error correction or concealment techniques can be applied when errors are detected.

SUMMARY

In general, the disclosure is directed to techniques for video data error control that may increase video encoder efficiency. A video encoder is configured to apply error control to RL errors prior to receiving a report of the error from a receiving device via end to end (E2E) error feedback. An error reported in E2E error feedback may be a reverse link (RL) error or a forward link (FL) error, which includes errors attributable to an access network. According to the disclosed techniques, an error filter distinguishes RL errors from FL errors or access network errors indicated by the E2E error feedback. In this manner, the disclosed techniques can prevent the video encoder from reapplying error control to an RL error that the video encoder has already addressed.

Applying error control to the same RL error twice may reduce the coding efficiency of the video encoder, and may also be an inefficient use of the transmission channel bandwidth because some error control techniques may add extra bandwidth. By determining whether the error reported in the E2E error feedback is an RL error, the error filter enables the encoder system to determine whether error control has already been applied to the error reported in the E2E error feedback or whether the video encoder should apply error control to the reported error. Hence, the disclosed techniques reduce or eliminate redundant error correction and associated inefficiency.

In some aspects, an encoder system also comprises a module for adapting the error control applied by the video encoder to channel bandwidth conditions. In some applications, such as in a packet switched network, the bandwidth of a wireless channel may vary, e.g., due to location, environment, or channel traffic loads. Accordingly, in order to help avoid overwhelming the wireless channel, the encoder system may incorporate a module to monitor the channel bandwidth conditions and select an error control technique based on the channel bandwidth conditions. As an illustration, intra-frame refreshing may be applied when channel bandwidth is higher, while random intra-macroblock (MB) refreshing (RIR) may be applied when channel bandwidth is lower.

In one aspect, the disclosure is directed to a method comprising receiving an indication of a video data error detected by a video decoder, determining whether the video data error occurred on a reverse link of a wireless network between a video encoder and a network device, and applying error control in response to indication of the video data error if the video data error did not occur on the reverse link and not applying error control in response to the video data error if the video data error occurred on the reverse link.

In another aspect, the disclosure is directed to a system comprising a transceiver to receive an indication of a video data error detected by a video decoder, a video encoder, and an error filter to determine whether the video data error occurred on a reverse link of a wireless network between the video encoder and a network device, wherein the video is configured to apply error control in response to the indication of the video data error if the video data error did not occur on the reverse link.

In yet another aspect, the disclosure is directed to a computer program product comprising a computer-readable medium comprising instructions. The instructions cause a computer to receive an indication of a video data error detected by a video decoder, determine whether the video data error occurred on a reverse link of a wireless network between a video encoder and a network device, and apply error control in response to the video data error if the video data error did not occur on the reverse link and not apply error control in response to the video data error if the video data error occurred on the reverse link.

In another aspect, the disclosure is directed to a system comprising means for receiving an indication of a video data error detected by a video decoder, means for determining whether the video data error occurred on a reverse link of a wireless network between a video encoder and a network device, and means for applying error control in response to the video data error if the video data error did not occur on the reverse link and not applying error control in response to the video data error if the video data error occurred on the reverse link.

The details of one or more examples of the disclosure are set forth in the accompanying drawings and the description below.

DETAILED DESCRIPTION

Figure 1:
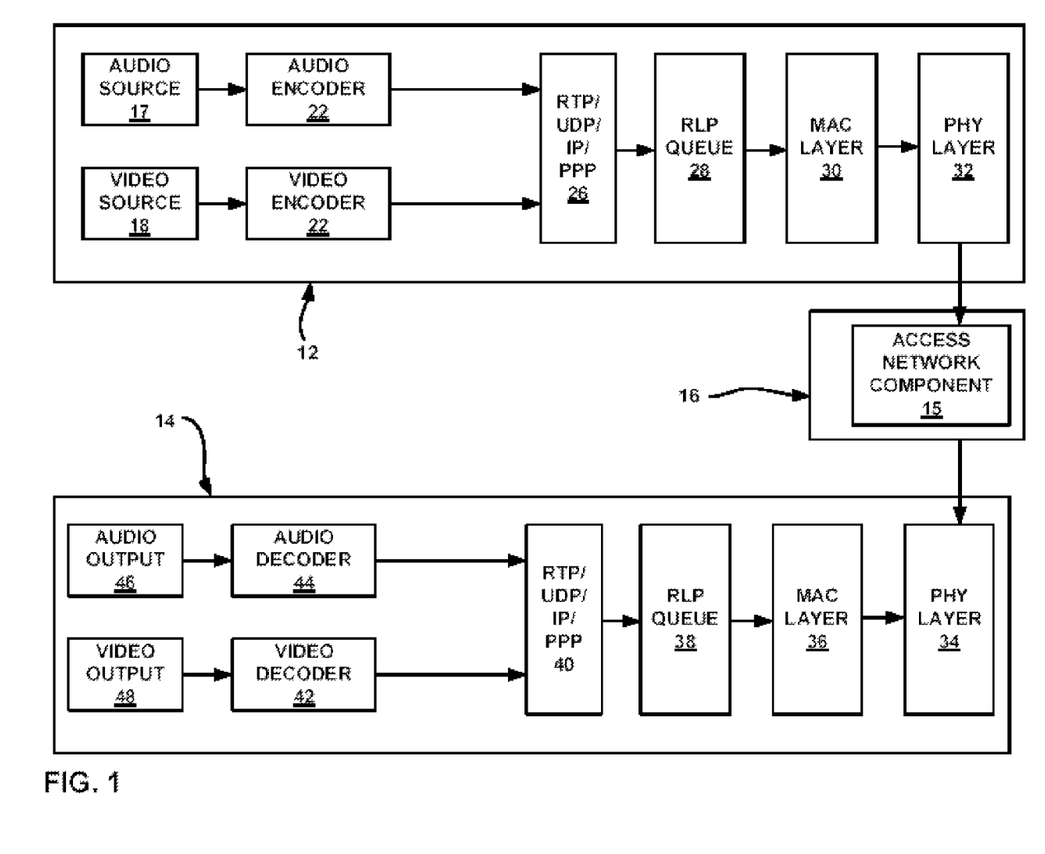
FIG. 1 is a diagram illustrating a video/audio encoding and decoding system for video telephony applications.

FIG. 1 is a block diagram illustrating a video encoding and decoding system 10. As shown in FIG. 1, system 10 includes an encoder system 12 and a decoder system 14 connected by a transmission channel 16, which includes one or more access network (AN) components 15. Encoder system 12 and decoder system 14 may represent various types of devices, such as wireless phones, cellular phones, laptop computers, wireless multimedia devices, video gaming devices, digital music players, digital video players, digital broadcast servers, wireless communication personal computer cards, personal digital assistants (PDA), external or internal modems or any device that communicates through a wireless channel.

AN component 15 may refer to the network portion of a communication system, and may include or implement the function of a base station (BS), a base-station transceiver system (BTS), an access point (AP), a modem pool transceiver (MPT), a Node B (e.g., in a WCDMA type system), and so forth. The encoder system 12 and decoder system 14 each communicate with AN component 15 on a forward link (FL) and/or a reverse link (RL). The FL, which is also referred to as a "downlink," refers to transmission from AN component 15 to system 12 or 14. The reverse link, which is also referred to as an "uplink," refers to transmission from system 12 or 14 to AN component 15.

System 10 may provide bi-directional video and audio transmission, e.g., for video telephony (VT) via transmission channel 16. VT refers to real-time communication of audio and video packets between at least two devices, such as systems 12 and 14. Accordingly, generally reciprocal encoding, decoding, and conversion modules may be provided in systems 12 and 14 on opposite ends of channel 16. Alternatively, one or both of systems 12 and 14 may be dedicated only to audio and video encoding and transmission, or only to audio and video reception and decoding. In some examples, encoder system 12 and decoder system 14 may be embodied within video communication devices such as wireless mobile terminals equipped for video streaming, video telephony, or both. The mobile terminals may support VT according to packet-switched standards such as real-time transport protocol (RTP), User Datagram Protocol (UDP), Internet Protocol (IP) or point to point protocol (PPP).

System 10 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. Typically, for VT applications, system 10 will be designed to support high data rate (HDR) technologies such as cdma2000 1x EV-DO Release 0 and Revision A.

Encoder system 12 is associated with a first video communication device and includes an audio source 17, video source 18, video encoder 20, an audio encoder 22, a real-time transport protocol (RTP)/user datagram protocol (UDP)/Internet protocol (IP)/point-to-point protocol (PPP) conversion module 26, an radio link protocol (RLP) queue 28, a MAC layer module 30 and a PHY layer module 32. As will be described, encoder system 12 may also include an error filter to differentiate between errors attributable to different sources, as well as a module for adapting error control to an available bandwidth of channel 16. Decoder system 14 is associated with another video communication device and includes a PHY layer module 34, MAC layer module 36, RLP queue 38, RTP/UDP/IP/PPP conversion module 40, a video decoder 42, and an audio decoder 44.

Video source 18 may be a video capture device, such as a video camera, one or more video archives or a combination of a video camera and video archives, or a live broadcast source from a content provider. System 10 may support video telephony or video streaming according to the Session Initiated Protocol (SIP), ITU-T H.323 standard, ITU-T H.324 standard, or other standards. Video encoder 20 generates encoded video data according to a video compression standard, such as MPEG-2, MPEG-4, ITU-T H.263, or ITU-T H.264 and its counterpart, ISO/IEC MPEG-4, Part 10, i.e., Advanced Video Coding. System 10 also may be configured to support Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification").

Video encoder 20 and video decoder 42 each may be implemented as one or more processors, digital signal processors, application specific integrated circuits (ASICs), field programmable gate arrays (FPGAs), discrete logic, software, hardware, firmware or any combinations thereof. Each of video encoder 20 and video decoder 42 may be included in one or more encoders or decoders, either of which may be integrated as part of a combined encoder/decoder (CODEC) in a respective subscriber device, broadcast device, server, or the like. In addition, system 12 and system 14 each may include appropriate modulation, demodulation, frequency conversion, filtering, and amplifier components for transmission and reception of encoded video, as applicable, including radio frequency (RF) wireless components and antennas. For ease of illustration, however, such components are not shown in FIG. 1.

Audio source 17 may be an audio capture device, such as a microphone or a speech synthesizer device, which captures audio data to accompany the video data from video source 18. Alternatively, audio source 17 may include an audio archive or a live audio broadcast source from a content provider. Audio encoder 22 may encode the audio data according to an audio compression method, such as adaptive multi-rate narrow band (AMR-NB), or other techniques. For VT applications, the video will permit viewing of a party to a VT conference and the audio will permit the speaking voice of that party to be heard. For other applications, such as multimedia streaming or broadcasting, the audio and video form part of a multimedia content, such as a presentation, show or movie.

In operation, RTP/UDP/IP/PPP conversion module 26 obtains the encoded frame of video data and encoded audio data from video encoder 20 and audio encoder 22 and adds appropriate header information (e.g., routing and sequencing information) to the video and audio packets and inserts the resulting data within RLP queue 28. Typically, RTP runs on top of UDP, while UDP runs on top of IP, and IP runs on top of PPP. RTP is a protocol developed for transmitting real time data, such as multimedia data. In RTP, the output of video encoder 20 as well as audio encoder 22 are grouped into data packets. Thus, a frame of video data may be separated into one or more packets of data for transmission of the frame over channel 16 to decoder system 14, and multiple frames are typically transmitted as multiple packets of data. Each packet includes a sequence number (SN) for identification and sequencing purposes. The SN may be included, for example, in the RTP/UDP/IP/PPP header information.

MAC layer module 30 retrieves data from RLP queue 28 and generates MAC layer packets from the contents of RLP queue 28. Each MAC layer packet carries RTP/UDP/IP/PPP header information and audio or video packet data that is contained within RLP queue 28. Audio packets may be inserted into RLP queue 28 independent of video packets. In some cases, a MAC layer packet generated from the contents of RLP queue 28 will only carry header information and video packet data. In other cases, the MAC layer packet will carry header information, audio packet data, and video packet data, depending on the contents of RLP queue 28. The MAC layer packets may be configured according to a RLP, and may also be referred to as MAC RLP packets.

PHY layer module 32 converts the MAC RLP packets into PHY layer packets for transmission over channel 16. In particular, a transceiver within encoder system 12 transmits the PHY layer packets to AN component 15 over channel 16. Channel 16 carries the PHY layer packets to decoder system 14. Channel 16 may be any physical connection between encoder system 12 and decoder system 14. For example, channel 16 may be a wired connection, such as a local or wide-area wired network. Alternatively, as described herein, channel 16 may be a wireless connection such as a cellular, satellite or optical connection. More typically, channel 16 may include a combination of wired and wireless media.

PHY layer module 34 and MAC layer module 36 of decoding system 14 operate in a reciprocal manner. PHY layer module 34 converts/reassembles PHY layer packets received from channel 16 to MAC RLP packets. MAC layer module 36 reassembles the contents of the MAC RLP packets to provide video and audio packets for insertion of the MAC RLP packets into RLP queue 38. RTP/UDP/IP/PPP conversion module 40 strips the header information from the data in RLP queue 38, and reassembles the video and audio data for delivery to video decoder 42 and audio decoder 44, respectively.

Video decoder 42 decodes the video data frames to produce a stream of video data for use in driving a display device (video output) 48. The SN associated with each packet may help video decoder 42 reorder and reassemble the video data packets into frames. For example, the packets may be received out of sequence from a temporal perspective, requiring reordering into the proper temporal sequence. Audio decoder 44 decodes the audio data to produce audio information for presentation to a user (e.g., via an audio speaker (audio output) 46).

Errors may occur during transmission of a frame of video data from encoder system 12 to decoder system 14. Errors may include a lost packet or a packet containing lost data. Hereinafter, "lost packet" refers to both loss of an entire packet and loss of data within a packet. The video data error may occur on a RL (e.g., from encoder system 12 to AN component 15), on a FL (e.g., from AN component 15 to decoder system 14), or within AN component 15. Hence, errors may be considered RL errors or FL errors. In general, errors occurring within AN component 15 will also be referred to as FL errors. Errors may occur within AN component 15 for many reasons. For example, if AN component 15 is comprised of more than one core network, a loss of one or more video packets or data within the packets may occur as the video data is transmitted between core networks.

Encoder system 12 may identify RL errors via one or more techniques. In one error identification technique, video encoder 20 queries one or more lower layers of encoder system 12 to determine whether an error occurred during a transmission of a most recently encoded video frame before video encoder 20 encodes a new video frame. Detecting the error prior to encoding a new video frame enables video encoder 20 (or an error control module within encoder system 12) to perform error control on the current, most recently encoded frame relatively quickly without waiting for feedback from decoder system 14.

Figure 2:
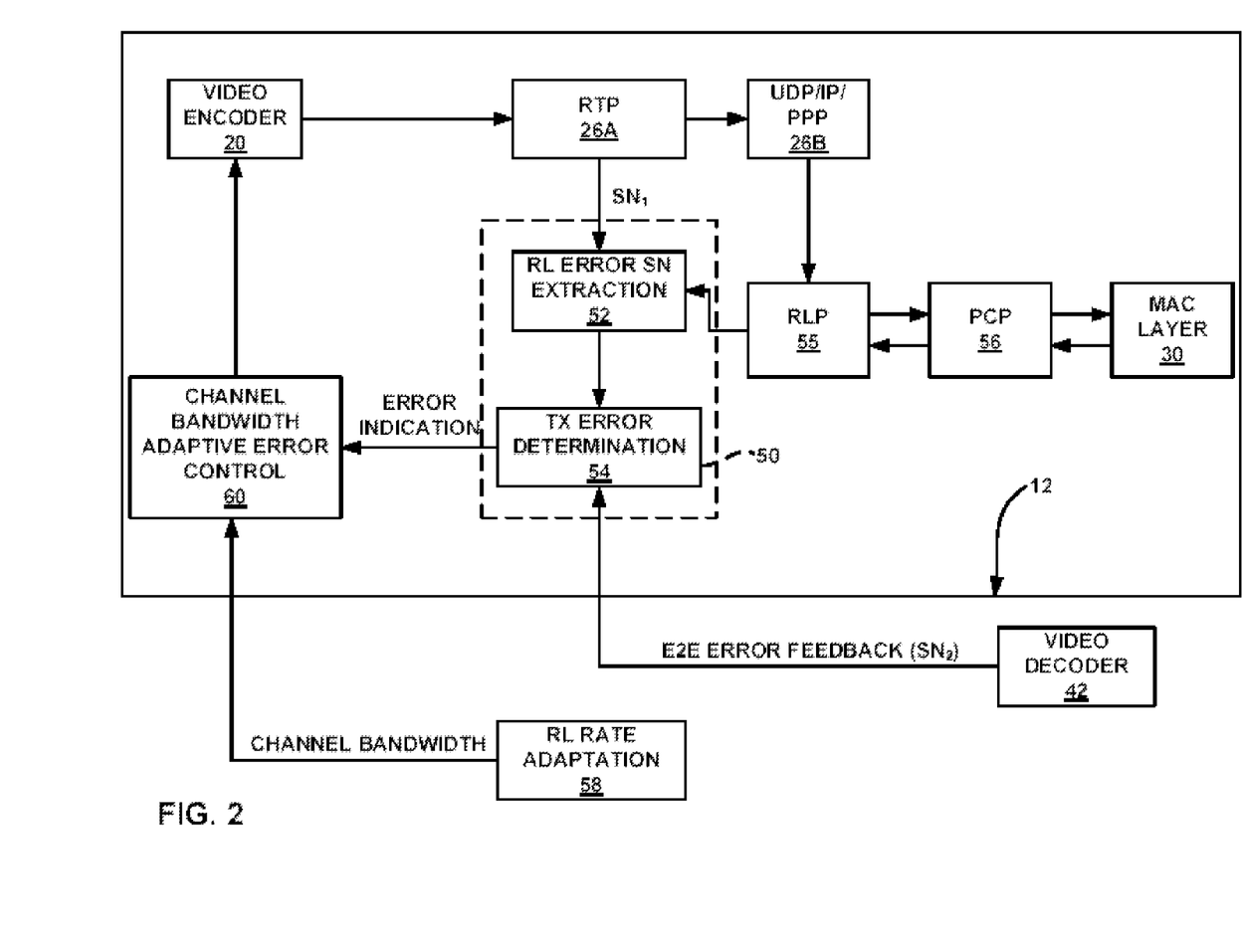
FIG. 2 is a diagram illustrating a video/audio encoding and decoding system implementing an error filtration technique.

FIG. 2 is a diagram illustrating encoder device 12 implementing an error filtration technique. In the example shown in FIG. 2, encoder device 12 includes UDP/IP/PPP layer 26B, MAC layer 30, error filter module 50, radio link protocol (RLP) module 55, packet consolidation protocol (PCP) module 56, RL rate adaptation module 58, and Channel Bandwidth Adaptive Error Control module 60. Some components of encoder system 12 that are shown in FIG. 1, such as audio encoder 22 and PHY layer 32, have been removed from the diagram of FIG. 2 for clarity of illustration.

As described in further detail below, error filter module 50 that determines whether an error reported in E2E error feedback from decoder system 14 has already been corrected. That is, error filter 50 filters out RL errors from the errors reported in the E2E error feedback, which may help video encoder 20 avoid unnecessarily applying error control to the RL errors reported in the E2E feedback. In the example of encoder system 12 shown in FIG. 2, error filter 50 is in the same layer as RTP 26A. Error filter 50 includes RL Error SN Extraction module 52 and Transmission (TX) Error determination module 54.

In one example, the lower layers of encoder system 12 keep track of the transmission status of a video frame by a flag, such as a binary bit field. For example, when a error occurs between encoding system 12 and AN component 15, AN component 15 may send a negative acknowledgement (NAK) to MAC layer 30. MAC layer 30 may inform PCP module 56 of the MAC packet associated with the NAK. PCP module 56 determines if the lost MAC packet contains any video flow data. Audio and video data can be placed in the same MAC packet, even though quality of service (QoS) is supported in the EV-DO Rev A reverse link. If there is video data in the lost MAC packet, PCP module 56 will inform a RLP module 55 (shown in FIG. 2) of the lost data, and identify the particular RLP queue (there may be several RLP queues) that contains the packet that experienced an error in transmission with a RLP packet NAK.

RLP module 55 determines which packet contains the lost data. Then, RLP module 55 informs RTP layer 26A in an application layer which packet includes the lost data with a video flow packet NAK. RTP layer 26A may maintain a map or table that converts the lost packet into lost MBs in a frame. The information identifying the lost MBs is passed to video encoder 20 (or an error control module) for further error control. For example, video encoder 20 may apply an intra-frame refresh or a random intra-MB refresh to conceal the error.

In another approach for identifying RL errors in which the lower layers of encoder system 12 keep track of the transmission status of a video frame by a flag, video encoder 20 may query RLP module 55 before encoding each new frame of video data, and error information may be passed directly to video encoder 20 for error control. MAC layer 30 may automatically send a NAK to PCP module 56 if a RL error occurs, and the PCP module may send a NAK to RLP module 55, which sets the flag.

In either of the approaches discussed above, if a packet of the video frame is lost, the flag within the lower layer of encoder system 12 is set. Once video encoder 20 queries the RLP module 55 to check the flag, the flag is reset for the next encoded video frame. Video encoder 20 applies error control to the next encoded frame of video data if the flag is set. The flag only indicates whether there was a RL error in the transmission of the most recently encoded video frame, rather than the specific packet that was lost. Thus, video encoder 20 may not know which part of the frame is lost and applies error control assuming that the error occurred in any part of the frame. Because the error control is applied to the entire frame, knowing if there is any error may be just as useful as knowing which packet of video data was lost.

The lower layer assisted video error control techniques described above address errors that occur to video data during transmission on the RL (i.e., RL errors). The techniques may enable video encoder 20 to use error information from MAC layer 30 and immediately apply error control, without waiting for feedback from the decoder system 14 (i.e., the receiving device).

Another technique identifies both RL and FL errors, which includes errors occurring within AN component 15. For example, decoder system 14 may provide feedback to video encoder 20 of encoder system 12 indicating that an error has occurred. A transceiver (not shown) of encoder system 12 may receive the feedback from decoder system 14. Video encoder 20 may then apply error control to the next encoded frame to prevent error propagation. Error reporting from decoder system 14 to encoder system 12 may be referred to as "end to end (E2E) feedback."

The use of E2E feedback may be based on an Audio Video Profile Feedback (AVPF) RFC 4585, which provides a real-time control protocol (RTCP) based feedback mechanism that enables a video data receiving device (i.e., decoder system 14) to provide immediate feedback to encoder system 12. E2E feedback typically comprises a SN of a lost RTP packet or a RTP packet containing lost data. For example, if an RTP packet with a SN of 100 is lost, decoder system 14 detects the loss and sends an RTCP feedback with the SN 100 to encoder system 12 with AVPF payload.

Once video encoder 20 detects an error, video encoder 20 may apply error control according to any suitable technique. Examples of suitable error control techniques include using a different reference frame for the next video frame that is encoded, increasing a macroblock (MB) intra refresh rate (i.e., "intra-macroblock refreshing), or inserting an intra-frame (I-frame) to stop error propagation at decoder device 14 (i.e., "intra-frame insertion"). In an I-frame, every MB is intra-coded, i.e., each MB does not depend on the previous frame, which can stop error propagation. For MB-intra refresh, only some MBs are intra-coded. Intra-frame insertion may provide better video quality when errors occur, but consumes more bandwidth because the entire I-frame is transmitted rather than MBs forming only a portion of the frame. In one type of error control technique that uses a reference frame to encode a subsequent frame, MBs of a frame of video data may be encoded by motion based coding. Motion based coding involves identifying a MB of a previous frame that is similar (a predictive MB), and sending a motion vector to identify the predictive MB in the previous frame (or subsequent frame in bi-directional coding) and sending a difference block indicative of the differences between the current MB and the predictive MB. A motion vector generally characterizes the distance between the best match MB (i.e., a predictive MB) in the previously encoded frame and the given MB. When video encoder 20 detects an error, video encoder 20 may use a frame encoded prior to the frame including the error as the reference frame for the next video frame that is encoded.

Video encoder 20 is configured to apply error control based on two sources of information: RL error feedback and E2E error feedback. As discussed above, in wireless video communication, the error reported in the E2E error feedback may be attributable to an error occurring in the RL or the FL. The E2E feedback does not include an indication of where the error occurred, and thus video encoder 20 typically is unable to determine the origin of the lost packet.

In some cases, the E2E error feedback may report an RL error that video encoder 20 already identified by querying one or more lower layers, such as RLP module 55, of encoder system 12. Because video encoder 20 applies error control to the RL error upon identification of the RL error, video encoder 20 has typically addressed the RL by the time the RL error is reported by the E2E error feedback. However, because video encoder 20 is unable to determine the origin of the error reported in the E2E error feedback and distinguish between RL errors and FL errors, video encoder 20 may apply error control to the same RL error more than once, which may be an inefficient use of resources and bandwidth. For example, applying error control to the same error twice may diminish the coding efficiency of video encoder 20 and cause the quality of video output 48 to degrade.

Video encoder 20 corrects RL errors prior to receiving a report of the RL error from decoder system 14 (via E2E error feedback). Correcting the RL error relatively shortly after detecting the RL error helps reduce artifacts caused by a lost packet or a packet containing lost data. In the example shown in FIG. 2, video decoder 42 provides the E2E error feedback. In other examples, however, other components of decoder system 14 may provide E2E error feedback to encoder system 12. As discussed above, video encoder 20 may employ any suitable technique for identifying RL errors. In the example shown in FIG. 2, video encoder 20 queries RLP module 55 and reads a flag set within RLP module 55 in order to identify whether a RL error occurred during the transmission of a recently encoded video frame to AN component 15 (i.e., during a RL transmission).

Error filter 50 is configured to receive E2E error feedback from video decoder 42 and determine the origin of the error. If error filter 50 determines that a reported E2E error occurred on the RL, it may be unnecessary for video encoder 20 to correct the RL error a second time. However, if error filter 50 determines that the error reported in the E2E error feedback occurred on the FL, video encoder 20 may correct the FL error in order to stop error propagation. In other words, error filter 50 determines whether a reported E2E error has already been corrected as part of a RL error or whether video encoder 20 should correct the error.

Error filter 50 may keep track of RL errors that are corrected by video encoder 20 via at least two techniques. In a first technique, error filter 50 receives a sequence number (SN) of a video packet of a video frame that was lost on the RL. In a second technique, error filter 50 receives information that indicates whether a recently-encoded video frame had a RL error. Error filter 50 in accordance with the second technique is shown in FIG. 2. In one example of the second technique for identifying RL errors, RTP layer 26A assigns a SN to a last packet of a recently encoded video frame and provides this SN to RL Error SN Extraction module 52 of error filter 50. RL Error SN Extraction module 52 determines whether an RL error occurred (i.e., whether one or more packets or data within the packets was lost) when the encoded frame associated with the SN was transmitted to AN component 15 by reading the flag (e.g., the binary bit field) set in a lower layer of encoder system 12. The flag read by RL Error SN Extraction module 52 is the same flag read by video encoder 20 to identify an RL error. The flag indicates whether any data has been lost on a video flow since the last time the lower layer was queried. If the frame associated with the SN had an error, RL Error SN Extraction module 52 stores the SN. If the frame associated with the SN did not have an error, RL Error SN Extraction module 52 continues storing the SN of the most recent frame that had a transmission error. The SN stored within RL Error SN Extraction module 52 is referred to as $SN_1$.

In some aspects, if any of the packets carrying the data for the encoded frame are lost, video encoder 20 applies error correction to the entire video frame. Accordingly, by keeping track of the $SN_1$ of the last packet of the most recently encoded video frame that included one or more RL errors, RL Error SN Extraction module 52 is able to track RL errors that video encoder 20 has corrected. For example, if an encoded frame is separated into packets with SNs 101 to 115, and the packet identified by SN 105 is lost on the RL, video encoder 20 applies error control to the encoded frame. Thus, even if transmission of the packet identified by SN 115 did not result in a RL error, and because SNs for are typically sequential, error control was also applied to the packet identified by SN 115. In this way, error filter 50 tracks RL errors that have been corrected rather than tracking exactly which packets were lost in the RL. Error filter 50 may also track RL errors that have been corrected by tracking the SN of the exact packet(s) that were lost or contained an error.

In other aspects, rather than applying error correction to an entire video frame, video encoder 20 applies error correction to the part of the frame of video data in which the error occurred. For example, video encoder 20 may apply error correction to a macroblock in the frame or a packet that carries multiple macroblocks. Accordingly, by keeping track of the sequence number $SN_1$ of the packet that were corrected or the packet containing the macroblock that was actually corrected, RL Error SN Extraction module 52 is able to track RL errors that video encoder 20 has corrected.

Video decoder 42 reports E2E error feedback to TX Error Determination module 54 of error filter 50 in the form of a sequence number $SN_2$ of a lost RTP packet. Video decoder 42 only sends E2E error feedback when there is an error and identifies the exact packet that was lost. The E2E error feedback may include more than one SN if more than on packet is lost. In one example, TX Error Determination module 54 tracks the highest SN reported by video decoder 42 as $SN_2$ because video encoder 20 will apply error control to the entire frame, and the highest SN is representative of the video frame. In other words, only the highest SN of the last packet used to encode a video frame is necessary to uniquely identify the frame.

In order to determine whether the error reported in the E2E error feedback is a RL error that has already been corrected or a FL error, TX Error Determination module 54 compares $SN_2$ received in the E2E error feedback with $SN_1$ of the last packet of the most recently encoded video frame that had errors. If $SN_2$ is greater than $SN_1$, the error reported in the E2E error feedback is a FL error because the higher $SN_2$ indicates that the packet identified by $SN_2$ was transmitted after the packet identified by $SN_1$. If an error occurred during transmission of the packet identified by $SN_2$ on the RL, RL Error SN Extraction module 52 would have recorded $SN_2$, or the SN of the last packet of the frame that the packet identified by $SN_2$ is a part of, as the highest SN of the most recent RL error that video encoder 12 corrected. However, because RL Error SN Extraction module 52 has stored $SN_1$ as identifying the most recent RL error, it is likely that the error within the packet identified by $SN_2$ occurred after the RL transmission. Thus, if $SN_2$ is greater than $SN_1$, TX error determination module 54 informs video encoder 20 than the error associated with $SN_2$ has not been previously corrected, in which case video encoder 20 applies error control to the next encoded frame.

On the contrary, if $SN_2$ is less than $SN_1$, the error reported in the E2E error feedback was a RL error that was already corrected because the packet identified by $SN_2$ was transmitted prior to the packet identified by $SN_1$, and accordingly, was already corrected. If $SN_2$ is less than $SN_1$, video encoder 20 does not apply any error control to the next encoded frame. If $SN_2$ is equal to $SN_1$, the error reported in the E2E error feedback is the same as the most recent RL error that was already corrected and video encoder 20 does not apply any error control to the next encoded frame.

Error filter 50 enables encoder system 12 to efficiently differentiate between RL video data transmission errors and FL video data transmission errors, which includes errors occurring within AN component 15. By differentiating between the different types of errors, duplicate error messages are filtered out of E2E error feedback, thereby preventing video encoder 20 from correcting the same error twice. In this way, video encoder 20 may operate more efficiently as compared to systems in which video encoder 20 corrects all errors reported in the E2E error feedback.

System 10 optionally includes RL Rate Adaptation module 58 and Channel Bandwidth Adaptive Error Control module 60 to adapt the error control implemented by video encoder 20 to an available bandwidth of channel 16. In the example of encoder system 12 shown in FIG. 2, TX Error Determination module 54 provides feedback to video encoder 20 via Channel Bandwidth Adaptive Error Control module 60. After error filter 50 determines whether to apply error control to an error reported in E2E error feedback from video decoder 42, Channel Bandwidth Adaptive Error Control module 60 may instruct video encoder 20 to apply error control according to a particular technique, where the technique is adapted to the available bandwidth of channel 16.

Channel conditions may be a concern for wired and wireless channels, but are especially problematic for mobile VT applications performed over a wireless channel 16, in which channel conditions may suffer due to fading or congestion. For example, channel 16 may be characterized by a reverse link (RL) having a throughput that varies according to channel conditions. Throughput may be estimated based on channel conditions, as represented by one or more of current wireless channel transmit rate, wireless base station activity, and transmit power limitations. For example, the channel conditions may be determined based on current MAC layer data rate, a reverse activity bit (RAB), and a power amplifier (PA) limit.

As a result of the varying channel conditions, video encoder 20 may adjust its encoding rate in order to avoid overwhelming channel 16. Error control typically occupies extra bandwidth or otherwise reduces coding efficiency, and therefore, as the bandwidth of channel 16 varies, Channel Bandwidth Adaptive Error Control module 60 may limit the types of error control applied by video encoder 20. RL Rate Adaptation module 58 monitors RL conditions and Channel Bandwidth Adaptive Error Control module 60 adjusts the encoding rate of video encoder 20 and the type of error control applied by video encoder 20 in accordance with the RL conditions. For example, when channel bandwidth is limited, Channel Bandwidth Adaptive Error Control module 60 may instruct video encoder 20 to apply error control via intra-MB refresh rather than intra-frame insertion, which typically requires a higher bandwidth than intra-MB refresh error control. In this way, Channel Bandwidth Adaptive Error Control module 60 enables error control applied by video encoder 20 to be channel bandwidth adaptive.

Examples of rate adaptation techniques that may be used are described in U.S. patent application Ser. No. 11/445,099, entitled "VIDEO RATE ADAPTATION TO REVERSE LINK CONDITIONS," and filed on May 31, 2006. As described in the above-referenced patent application, in one example technique for adapting video data encoding rates implemented by video encoder 20 to match RL channel conditions, a video throughput is estimated based on a total size of a video flow RLP queue 28 (FIG. 1). In this case, queue fullness is used as an indication of RL channel conditions. Queue fullness is likely to be caused, at least in part, by degrading channel conditions that reduce the rate at which packets are pulled from the RLP queue 28.

In another example technique, video encoder 20 may use information from MAC layer 30 and RLP layer 26 to monitor RL channel conditions and adjust its encoding rate according to the channel condition. For example, the channel conditions may be determined based on current MAC layer data rate, a reverse activity bit (RAB), and a power amplifier (PA) limit, which is indicated by a PA bit within MAC layer 30. The PA limit represents transmit power headroom and indicates when channel conditions have degraded. Power headroom limitation is measured in decibels (dBs) and limits the maximum possible payload size of MAC layer packets. The lower the power headroom limitation value is, the smaller the maximum possible payload size is, and hence the lower the throughput. The headroom limitation may indicate the maximum rate that is allowed to be used in transmission, based on the current transmit power.

Figure 3:
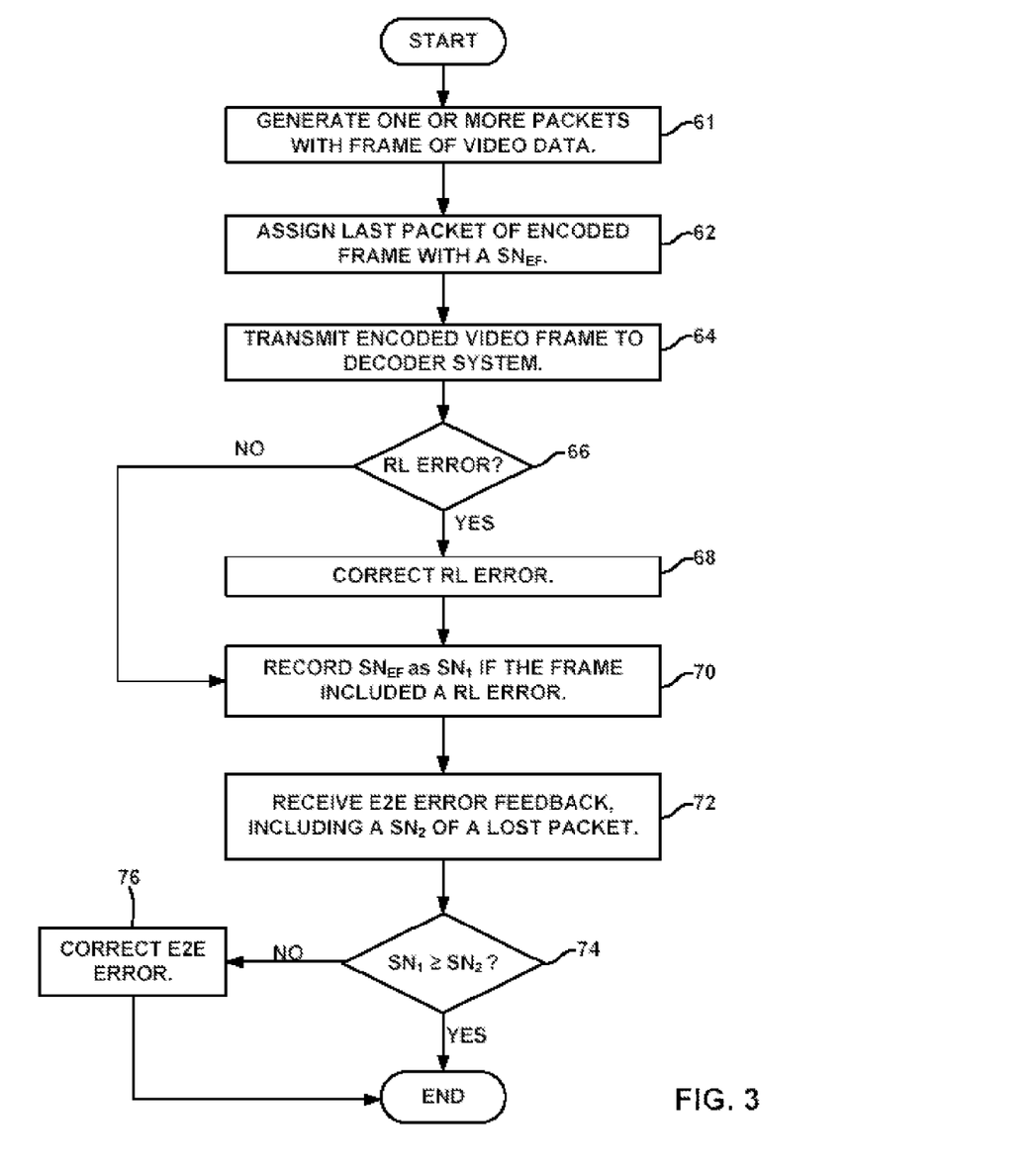
FIG. 3 is a flow diagram illustrating a technique for filtering reverse link errors from end to end error feedback.

FIG. 3 is a flow diagram illustrating an example operation of encoder device 12 that employs a technique for filtering RL errors from E2E error feedback. Upon generating one or more packets with an encoded frame of video data received from video source 18 (61), RTP layer 26A assigns a sequence number $SN_{EF}$ to a last packet of the recently encoded video frame (62), and provides $SN_{EF}$ to RL Error SN Extraction module 52. After the encoded video frame is converted into PHY layer packets, encoder system 12 transmits the video frame to decoder system 14 via AN component 15 and channel 16 (64).

Video encoder 20 may determine whether a RL transmission error occurred during transmission of the packets of the recently encoded frame to decoder system 14 (66). As described above, video encoder 20 may employ any suitable technique for identifying RL errors, such as querying the lower layer of encoder system 12, such as RLP module 55, to check a flag that indicates whether an error occurred. If an error occurred (e.g., if the flag within the lower layer is set), video encoder 20 may apply error correction to the RL transmission error by, for example, using a different reference frame for the next video frame that is encoded, applying a intra-MB refresh or inserting an I-frame to stop the error propagation (68).

RL Error SN Extraction module 52 may also determine whether a transmission error occurred when the recently encoded video frame was transmitted to decoder system 14. Again, RL Error SN Extraction module 52 may also query a lower layer of encoder system 12 to determine whether a transmission error occurred. If a transmission error occurred, RL Error SN Extraction module 52 records $SN_{EF}$ as $SN_1$. If a transmission error did not occur when the most recently encoded frame was transmitted to decoder system 14, RL Error SN Extraction module 52 maintains a previously recorded $SN_1$, which is associated with the most recent frame that had an RL transmission error (70).

TX Error Determination module 54 of error filter 50 may receive E2E error feedback from decoder system 14, where the E2E error feedback includes a sequence number $SN_2$ of a lost packet or a packet containing lost data. Error filter 50, and particularly TX Error Determination module 54, compares $SN_1$ with $SN_2$ (72) to determine whether the error reported in the E2E error feedback is an RL error that was already corrected by video encoder 20. If $SN_1$ is less than $SN_2$ (74), the error reported in the E2E error feedback is a FL error that has not yet been corrected. TX Error Determination module 54 informs video encoder 20 that the error reported in the E2E error feedback is a FL link error and video encoder 20 may then apply error control to a frame that is subsequently encoded (76) to stop the error propagation. That is, if $SN_1$ is greater than or equal to $SN_2$, video encoder 20 may (a) use a different reference frame for a new frame, (b) increase macroblock (MB) intra refresh rate, or (c) insert an intra-frame (I-frame) to stop error propagation at decoder system 14.

If $SN_2$ is greater than or equal to $SN_1$, the error reported in the E2E error feedback is a RL error that was already corrected and video encoder 20 does not take any action to correct the error. If $SN_2$ is equal to $SN_1$, the frame including the packet reported in the E2E error feedback is the most recent frame that had a RL error, which video encoder 20 already corrected, and video encoder 20 does not take any further action to correct the video packet associated with $SN_2$.

The process shown in the flow diagram of FIG. 3 may occur within any suitable time span. In one example, an error reported in an E2E error feedback is corrected, if necessary, in about 660 milliseconds from the time that video encoder 20 generates the video frame (61). After the 660 millisecond time frame, the process may be repeated for another frame of video data. The SN buffer within the RL Error SN Extraction module 52 retains the previously recorded $SN_1$ until the $SN_1$ is overwritten with the SN of the most recent RL error.

Figure 4:
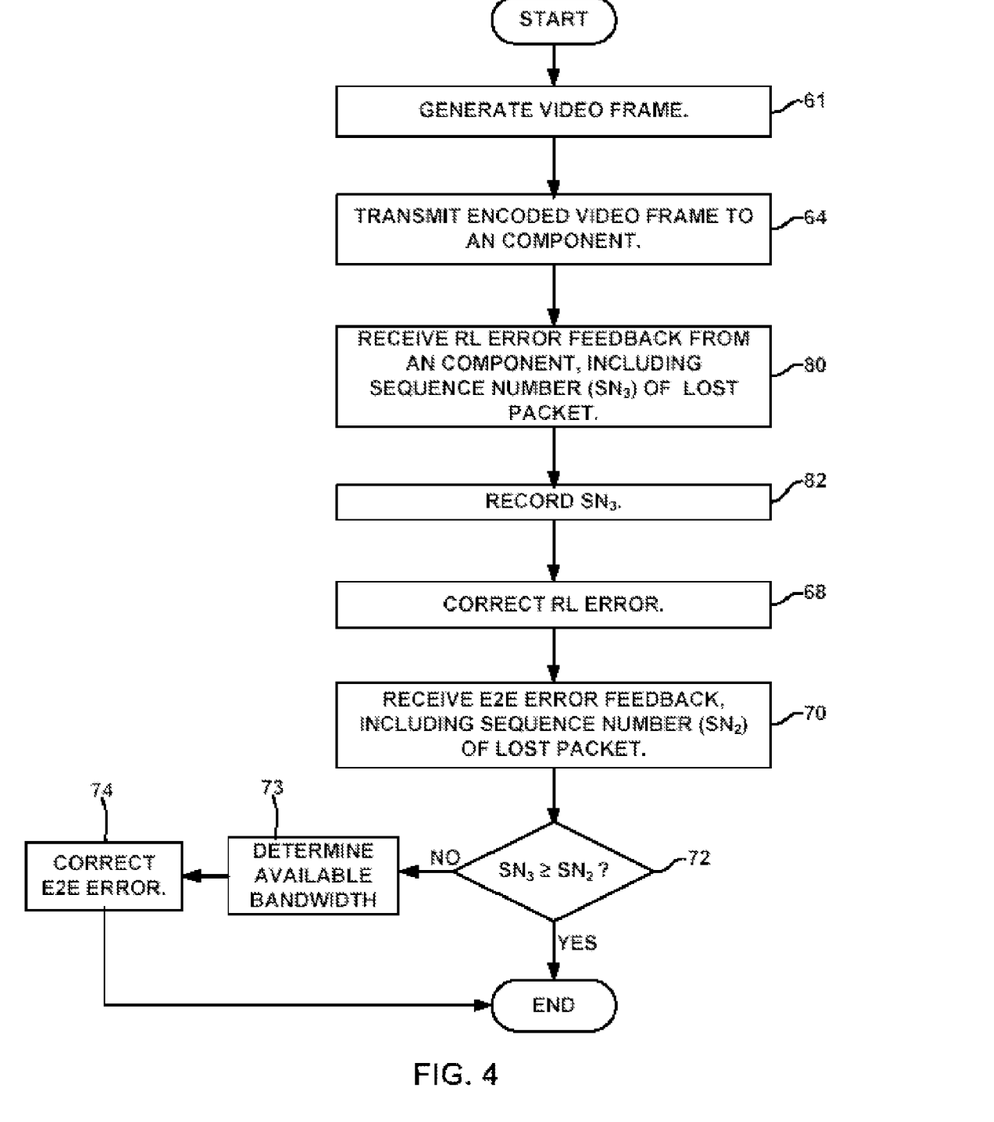
FIG. 4 is flow diagram illustrating another technique for filtering reverse link errors from end to end error feedback.

FIG. 4 is flow diagram illustrating another example operation of encoder system 12 employing another technique for filtering RL errors from E2E error feedback. The process shown in FIG. 4 substantially conforms to that shown in FIG. 3, but differs in error filter 50 identifies the most recent RL error that was corrected by video encoder 20 by the sequence number $SN_3$ of the packet containing the error, rather than the last packet of the most recent frame of video data including the error. After video encoder 20 generates a video frame (61) from data received from video source 18, encoder system 12 transmits the video frame to decoder system 14 via AN component 15 and channel 16 (64).

In contrast to the example flow diagram shown in FIG. 3, in the operation shown in the flow diagram of FIG. 4, video encoder 20 identifies a RL error by a sequence number $SN_3$ of the exact packet containing lost data (80), rather than the $SN_1$ of the last packet of the most recently encoded frame that included an error. In the operation of encoder system 12 shown in FIG. 4, video encoder 20 may be configured to apply error correction to the packet identified by sequence number $SN_3$, rather than applying error correction to an entire video frame, which may span multiple packets, as in the example shown in FIG. 3. However, as an alternative, video encoder 20 may apply error correction to the entire video frame, even if the sequence number $SN_3$ of the exact packet containing lost data is identified and tracked by RL Error SN Extraction module 52.

In one example, AN component 15 sends a NAK to MAC layer 30 when a transmission error occurs, which informs PCP module 56 of the MAC packet associated with the NAK. After PCP module 56 determines that the MAC packet included video data, PCP module 56 informs RLP module 55 which RLP queue contains a packet that experienced an error in transmission with a RLP packet NAK. RLP module 55 determines which packet contains the lost data or which packet was lost, which enables RLP module 55 to determine a sequence number $SN_3$ of the packet. Implementation of a technique that identifies the $SN_3$ of a lost packet or a packet containing an error may be more complex than implementation of a technique that identifies $SN_1$ of a last packet of a video frame that included an error because the former technique may require modification of RTP layer 26A and RLP module 55.

RL Error SN Extraction module 52 records $SN_3$ of the exact packet containing lost data (82). The remainder of the flow diagram shown in FIG. 4 is similar to that shown in FIG. 3. In particular, video encoder 20 corrects the RL error using any suitable technique (68), error filter 50 receives E2E error feedback from video decoder 42 that indicates the $SN_2$ of a packet containing lost video data (72), and compares $SN_3$ with $SN_2$ to determine whether the error reported in the E2E error feedback is an RL error that was corrected by video encoder 20 (74). If $SN_3$ is greater than or equal to $SN_2$, the packet containing an error identified by $SN_2$ is an RL error and video encoder 20 does not take any corrective action.

If $SN_3$ is less than $SN_2$, the packet including lost data and having $SN_2$ is a result of a FL error, which has not been corrected by video encoder 20. Error filter 50 may then prompt video encoder 20 to apply error correction to the error reported in the E2E error feedback in order to prevent further propagation of error (76). In particular, the error filter 50 may prompt Channel Bandwidth Adaptive Error Control module 60, which then prompts video encoder. As previously discussed, RL Rate Adaptation module 58 monitors RL conditions and Channel Bandwidth Adaptive Error Control module 60 adjusts the encoding rate of video encoder 20 in accordance with the RL conditions. Thus, Channel Bandwidth Adaptive Error Control module 60 may determine the available bandwidth of the channel 16 on the RL (73) based on feedback from RL Rate Adaptation module 58 prior to prompting video encoder 20 to apply error control. Although now shown in FIG. 3, the process shown therein may also include determining the available bandwidth of the channel 16 on the RL prior to prompting video encoder 20 to apply error control.

The techniques described in this disclosure may be implemented within a general purpose microprocessor, digital signal processor (DSP), application specific integrated circuit (ASIC), field programmable gate array (FPGA) or other equivalent logic devices. For example, video encoder device 12, video decoder device 14, and associated components and modules may be implemented as parts of an encoding process, or coding/decoding (CODEC) process, running on a DSP or other processing device. Accordingly, components described as modules may form programmable features of such as a process or a separate process.

In one or more examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. As used herein, a medium includes any media that facilitates transfer of a computer program from one place to another.

Various examples of the disclosure have been described. These and other examples are within the scope of the following claims.

The invention claimed is:

1. A method comprising:
    storing information for a video data error prior to receiving an indication of the video data error from a video decoder, said video data error occurring on a reverse link of a wireless network between a video encoder and a network device, the network device separated from and coupled between the video decoder and the video encoder;
    receiving the indication of the video data error detected by the video decoder;
    determining whether the indicated video data error occurred on the reverse link of the wireless network between the video encoder and the network device based on the stored information; and
    applying error control in response to the received indication of the video data error if the indicated video data error did not occur on the reverse link and not applying error control in response to the received indication of the video data error if the indicated video data error occurred on the reverse link.

2. The method of claim 1, further comprising applying error control in response to the video data error prior to receiving the indication of the video data error from the video decoder.

3. The method of claim 1, wherein the video data error is a first video data error, and the method further comprises storing information relating to a second video data error that occurred on the reverse link of the wireless network prior to receiving the indication of the video data error from the video decoder, and wherein determining whether the first video data error occurred on the reverse link is based on the stored information.

4. The method of claim 3, further comprising applying error control in response to the second video data error.

5. The method of claim 3, wherein the indication of the first video data error includes a first sequence number of a first packet associated with the first video data error, and the information comprises a second sequence number of a second packet associated with the second video data error, and determining whether the first video data error occurred on the reverse link comprises comparing the first and second sequence numbers.

6. The method of claim 5, wherein the first packet comprises the first video data error.

7. The method of claim 5, wherein the second packet is a last packet of an encoded frame of video data, wherein the second video data error occurred within the encoded frame.

8. The method of claim 5, wherein the second packet comprises the second video data error.

9. The method of claim 3, wherein storing the information relating to the second video data error comprises:
assigning a sequence number to a last packet of an encoded frame of video data;
transmitting the encoded frame across the wireless network;
determining whether transmission of the encoded frame across the reverse link of the wireless network resulted in the second video data error; and
storing the sequence number if the transmission of the encoded frame across the reverse link of the wireless network resulted in the second video data error.

10. The method of claim 9, wherein determining whether transmission of the encoded frame resulted in the second video data error comprises checking whether a flag is set in a radio link protocol module.

11. The method of claim 1, wherein applying error control in response to the video data error if the video data error did not occur on the reverse link comprises selecting an error control technique based on an available bandwidth of the wireless network.

12. The method of claim 1, further comprising:
encoding a frame of video data to generate an encoded frame;
generating a packet with at least a portion of the encoded frame; and
transmitting the packet across the wireless network to the video decoder, wherein the video data error occurred within the encoded frame.

13. The method of claim 12, wherein before encoding a subsequent frame of video data, the method comprises determining whether transmitting the packet across the reverse link of the wireless network resulted in the video data error.

14. The method of claim 13, wherein determining whether transmitting the packet across the reverse link of the wireless network resulted in the video data error comprises:
determining whether a medium access control (MAC) layer received a negative acknowledgement (NAK) from the wireless network; and
determining whether the received NAK is associated with the packet.

15. The method of claim 14, wherein determining whether the MAC layer received the NAK from the wireless network comprises checking whether a flag is set in a radio link protocol (RLP) module.

16. The method of claim 1, wherein the error control comprises at least one of encoding a frame of video data as an intra-frame, increasing a percentage of intra-coded macroblocks or using a first encoded frame of video data that was encoded before a second frame of video data comprising the video data error as a reference for motion estimation.

17. A system comprising:
a video encoder;
an error filter configured to store information for a video data error prior to receiving an indication of the video data error from a video decoder, said video data error occurring on a reverse link of a wireless network between the video encoder and a network device, the network device separated from and coupled between the video decoder and the video encoder;
a transceiver to receive the indication of the video data error detected by the video decoder,
wherein the error filter is configured to determine whether the indicated video data error occurred on the reverse link of the wireless network between the video encoder and the network device based on the stored information, and,
wherein the video encoder is configured to apply error control in response to the received indication of the video data error if the indicated video data error did not occur on the reverse link.

18. The system of claim 17, wherein the video encoder is configured to encode a frame of video data and the system further comprises a module to generate a packet with at least a portion of the encoded frame, the transceiver being configured to transmit the packet across a wireless network to the video decoder and the information comprises a sequence number of a last packet of the encoded frame.

19. The system of claim 17, wherein the video data error is a first video data error, and the error filter is configured to store information relating to a second video data error that occurred on the reverse link of the wireless network and determine whether the first video data error occurred on the reverse link based on the stored information.

20. The system of claim 17, wherein the video encoder is configured to encode a frame of video data and the system further comprises a module to generate a packet with at least a portion of the encoded frame, the transceiver being configured to transmit the packet across a wireless network to the video decoder and the information comprising a sequence number of a last packet of the encoded frame if the transmission of the encoded video frame across the wireless network resulted in the second video data error.

21. The system of claim 20, the system further comprising a radio link protocol (RLP) module and a medium access control (MAC) layer, wherein the RLP module is configured to determine whether the MAC layer received a negative acknowledgement (NAK) from the network device and determine whether the NAK is associated with the packet in order to determine whether the second video data error occurred when the packet was transmitted across the wireless network.

22. The system of claim 17, wherein the packet is a first packet, and the indication of the video data error comprises a sequence number of a second packet including lost data.

23. The system of claim 22, wherein the video data error is a first video data error and the sequence number is a first sequence number, the error filter comprising:
a first module to receive the first sequence number from the transceiver; and
a second module to receive a second sequence number identifying a last packet of a most recently encoded frame of video data comprising a second video data error that occurred on the reverse link,
wherein the error filter is configured to compare the first and second sequence numbers to determine whether the first video data error occurred on the reverse link.

24. The system of claim 23, the system further comprising a real-time transport protocol (RTP) layer to assign the second sequence number to the last packet and provide the second sequence number to the second module, wherein the second module determines whether the second video data error occurred by checking whether a flag is set in a radio link protocol module.

25. The system of claim 22, wherein the video encoder is configured to encode a frame of video data and the system further comprises a module to generate a packet with at least a portion of the encoded frame, the transceiver being configured to transmit the packet across a wireless network to the video decoder, wherein the video data error is a first video data error and the sequence number is a first sequence number, and the error filter comprises:
- a first module to receive the first sequence number from the transceiver; and
- a second module to receive a second sequence number identifying the packet of the frame of video data if transmission of the packet across the reverse link of the wireless network resulted in a second video data error,
- wherein the error filter is configured to compare the first and second sequence numbers to determine whether the first video data error occurred on the reverse link.

26. The system of claim 22, wherein the video data error is a first video data error, the packet is a first packet, and the sequence number is a first sequence number, the error filter comprising:
- a first module to receive the first sequence number from the transceiver; and
- a second module to receive a second sequence number identifying a second packet comprising a second video data error that occurred on the reverse link,
- wherein the error filter is configured to compare the first and second sequence numbers to determine whether the first video data error occurred on the reverse link.

27. The system of claim 17, further comprising:
- a first module to monitor a condition of the wireless network; and
- a second module to select an error control technique applied by the video encoder based on the condition of the wireless network.

28. The system of claim 17, wherein the error control comprises at least one of encoding a frame of video data as an intra-frame, increasing a percentage of intra-coded macroblocks or using a first frame of video data that was encoded before a second frame of video data comprising the video data error as a reference for motion estimation.

29. A computer program product comprising:
a non-transitory computer-readable medium comprising:
- instructions to cause a computer to store information for a video data error prior to receiving an indication of the video data error from a video decoder, said video data error occurring on a reverse link of a wireless network between a video encoder and a network device, the network device separated from and coupled between the video decoder and the video encoder;
- instructions to cause a computer to receive the indication of the video data error detected by the video decoder;
- instructions to cause a computer to determine whether the indicate video data error occurred on the reverse link of the wireless network between the video encoder and the network device based on the stored information; and
- instructions to cause a computer to apply error control in response to the received indication of the video data error if the indicated video data error did not occur on the reverse link and not apply error control in response to the received indication of the video data error if the indicated video data error occurred on the reverse link.

30. The computer program product of claim 29, the computer-readable medium further comprising instructions to cause a computer to monitor a condition of the wireless network and select the error control based on the condition of the wireless network.

31. A system comprising:
- means for storing information for a video data error prior to receiving an indication of the video data error from a video decoder, said video data error occurring on a reverse link of a wireless network between a video encoder and a network device, the network device separated from and coupled between the video decoder and the video encoder;
- means for receiving the indication of the video data error detected by the video decoder;
- said means for storing further capable of determining whether the video data error occurred on the reverse link of the wireless network between the video encoder and the network device based on the stored information; and
- means for applying error control in response to the indicated video data error if the indicated video data error did not occur on the reverse link and not applying error control in response to the indicated video data error if the indicated video data error occurred on the reverse link.

* * * * *